Figure 1:
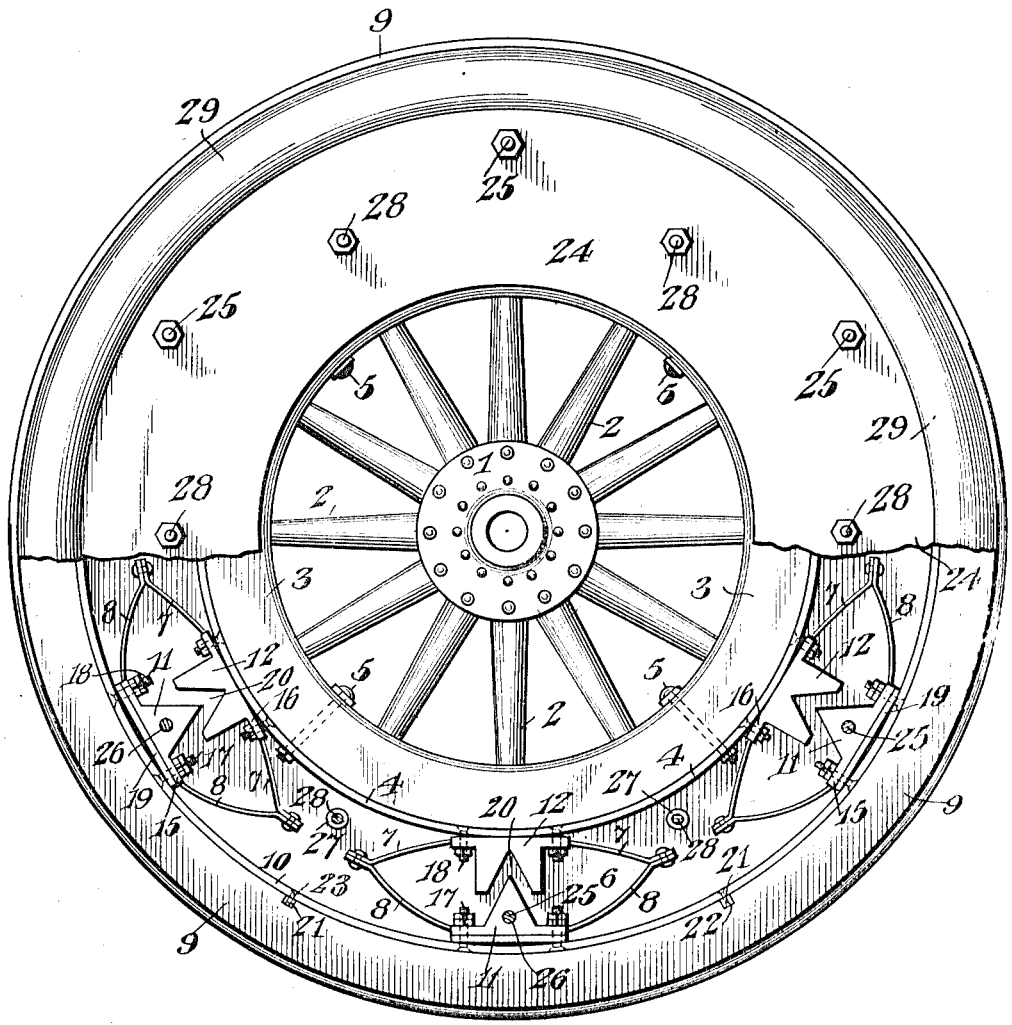

P. G. RAPP & P. H. KING.
SPRING WHEEL.
APPLICATION FILED MAY 15, 1911.

1,040,755.

Patented Oct. 8, 1912.

2 SHEETS—SHEET 1.

Peter G. Rapp
Peter H. King  Inventors

Witnesses

By  Attorney

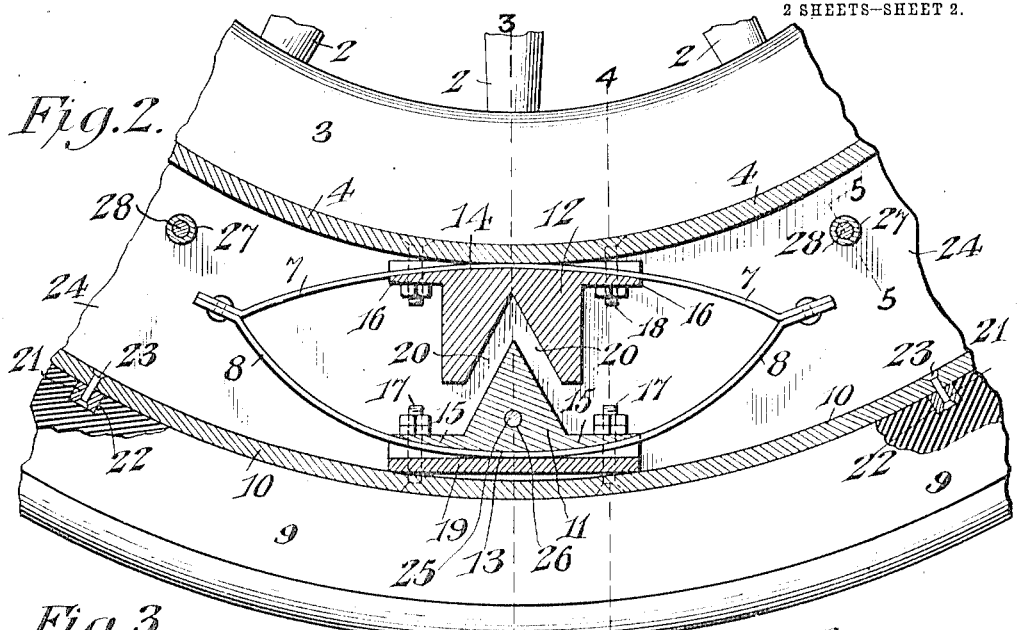
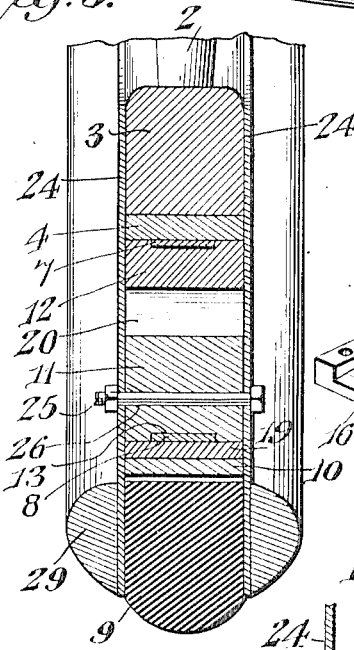
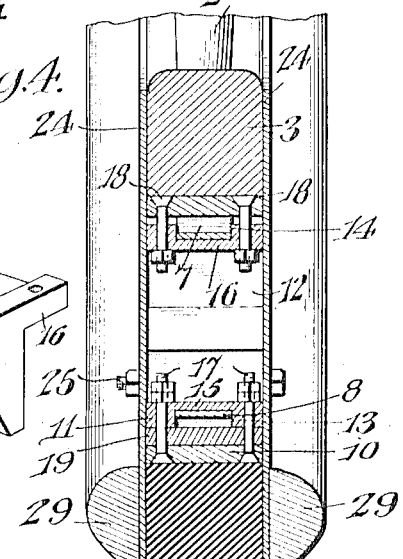
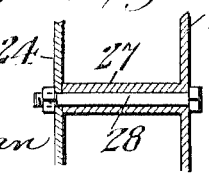

UNITED STATES PATENT OFFICE.

PETER G. RAPP AND PETER H. KING, OF CHICAGO, ILLINOIS.

SPRING-WHEEL.

1,040,755.

Specification of Letters Patent.

Patented Oct. 8, 1912.

Application filed May 15, 1911. Serial No. 627,258.

*To all whom it may concern:*

Be it known that we, PETER G. RAPP and PETER H. KING, citizens of the United States, residing at Chicago, in the county of Cook and State of Illinois, have invented a new and useful Spring-Wheel, of which the following is a specification.

The invention relates to improvements in spring wheels.

The object of the present invention is to improve the construction of spring wheels, and to provide a simple, practical and efficient spring wheel of comparatively inexpensive construction, designed for use on motor and other vehicles as a substitute for pneumatic tires, and capable of affording the desired resiliency.

A further object of the invention is to provide a noiseless wheel of this character equipped with means, adapted to permit free play of the springs within safe limits, and capable of relieving the springs of the various strains to which a wheel of a motor vehicle is subjected, whereby injury to the springs is prevented.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a spring wheel, constructed in accordance with this invention, a portion of the side plates being broken away to illustrate the arrangement of the cushioning springs and the co-acting blocks. Fig. 2 is an enlarged longitudinal sectional view of a portion of the wheel. Fig. 3 is a transverse sectional view on the line 3—3 of Fig. 2. Fig. 4 is a similar view on the line 4—4 of Fig. 2. Fig. 5 is a detail sectional view on the line 5—5 of Fig. 2. Fig. 6 is a detail perspective view of one of the blocks.

Like numerals of reference designate corresponding parts in all the figures of the drawings.

In the accompanying drawings in which is illustrated the preferred embodiment of the invention, the spring wheel comprises in its construction an inner wheel consisting of a hub 1, wooden spokes 2 and a wooden felly 3, which supports the inner metallic band 4, secured to the wooden felly by bolts 5, piercing the felly and the inner metallic band, as clearly illustrated in Fig. 1 of the drawings. The inner wheel may be of any preferred construction, as the improvements are applicable to various kinds of motor and other vehicle wheels. The felly and the inner metallic bands constitute an inner rim, which supports an annular series of approximately elliptic springs 6, consisting of inner and outer bowed spring members 7 and 8, secured together at their ends. The inner and outer members of the elliptic springs may consist of one or more leaves to provide springs of the proper strength to suit the character of wheel in which they are employed, and they are adapted to cushion a solid rubber tire 9, which is mounted on an outer metallic band or member 10, spaced from and arranged in parallelism with the inner metallic band or member 4. The springs are secured to the outer and inner metallic bands by co-acting male and female blocks 11 and 12, having longitudinal grooves 13 and 14 to receive the outer and inner members of the springs, and provided with projecting end lugs or flanges 15 and 16, which are secured by bolts 17 and 18 to the outer and inner metallic bands. The bolts 17 and 18 are arranged in pairs and are spaced apart to avoid perforating and weakening the inner and outer members of the springs, and they pierce the lugs of flanges and the inner and outer metallic bands.

Metallic plates 19 are preferably interposed between the male blocks and the outer band 10, the outer members 8 of the springs being interposed between the outer blocks 11 and the said plates 19, which are pierced by the bolts 17. The grooves 13 and 14 taper in depth from the ends to the center, the bottom walls of the grooves being curved longitudinally and arranged to clamp the inner and outer members of the springs at the central portions of the blocks, whereby the said inner and outer members are securely held against the inner metallic band and the outer plates without interfering with their free resilient action. The end portions of the grooves, which are of greater depth than the thickness of the springs, permit the inner and outer members thereof to spring inwardly and outwardly. The body portions of the outer male blocks are approximately triangular, and they taper inwardly and extend into tapering grooves 20 of the inner female blocks. The tapered triangular portions of the outer blocks conform to the configuration of the tapered recesses 20 of the inner female blocks, and are normally arranged in overlapping and spaced relation with the walls of the recesses, as clearly illustrated in Figs. 1 and 2 of the drawings, the distance between the blocks being sufficient to permit the springs to move freely within safe limits. The blocks, however, are arranged to engage with each other to prevent any undue compression or circumferential distortion of the springs and the inclined or angularly disposed faces of the tapered blocks and the tapered recesses are adapted to slide on each other in correcting circumferential distortion, and are adapted through such sliding movement to move the blocks toward a relative central position. This construction adapts the wheel particularly for use on motor vehicles, as the springs will not be injured by the application of the propelling power to the center of the wheel.

The outer metallic band is provided at its outer face with transverse ribs 21, which fit in transverse grooves 22 in the inner periphery of the solid rubber tire 9, whereby the latter is prevented from creeping on the outer band. The ribs may be formed integral with the outer band, or they may be secured to the same by rivets 23, or other suitable fastening means.

The elastic tire is maintained in proper position over the springs by means of metallic side plates 24, located at opposite sides of the wheel and loosely embracing the felly 3 and rigidly connected with the outer band 10 by transverse bolts 25, or other suitable fastening devices, which pierce the plates and pass through transverse openings 26 in the male blocks 11. The side plates are spaced apart by transverse tubes 27, rigidly connected with one of the side plates and extending across the space between the same and the other side plate and receiving transverse bolts 28, which serve to connect the inner portions of the plates. The side plates, which also serve to protect the springs from dust and dirt and from the weather, are equipped at their outer portions with rings 29, located at the outer portions of the side plates at opposite sides of the tire, and adapted to increase the width of the wheel adjacent to the tread of the tire, so that the wheel will present a broader tread in passing over soft sandy or muddy roads and also having an appearance as to size similar to that of a wheel equipped with a pnuematic tire. The rings 29, which are approximately semi-circular in cross section, present outer curved faces and have flat inner faces to fit the side plates, and they may be constructed of any suitable material, such as wood or metal, and be secured to the side plates in any preferred manner.

Having thus fully described our invention, what we claim as new and desire to secure by Letters Patent, is:—

1. A wheel of the class described including spaced inner and outer annular members, approximately semi-elliptic springs interposed between the said members, and opposite coacting blocks arranged in pairs within the springs midway of the ends thereof, said blocks being secured to the annular members at each end and having oppositely tapered longitudinal grooves extending from one end of the blocks to the other end and receiving the springs, the latter being clamped to the annular members by the said blocks, one of the blocks of each pair having a tapered recess and the other being tapered to fit the recess and normally extending into the same in overlapped relation but also in spaced relation to the walls of the recess to limit radial compression of the springs and to correct circumferential distortion.

2. A wheel of the class described including an inner rim, an outer tire, compression springs interposed between the rim and tire, co-acting blocks oppositely arranged in pairs between the rim and tire, one block of each pair having formed in its face a notch with tapering walls, said notch extending transversely of the wheel, the other block of each pair tapered to fit said notch and extending into the same but in spaced relation to the wall thereof to limit radial compression of the springs and circumferential relative movement of the rim and tire, and rigid side plates secured to the tire and overlapping the rim to prevent lateral relative movement of the rim and tire.

3. A wheel of the class described including spaced inner and outer annular members having relative movement, approximately semi-elliptic springs interposed between the said members, and co-acting blocks arranged in pairs within the springs and provided at their ends with projecting flanges secured to the annular members, said blocks clamping the inner and outer portions of the springs in place and provided between the flanges with co-acting normally interlocking inclined portions spaced apart and arranged to limit the transverse compression and longitudinal distortion of the springs.

4. A wheel of the class described including inner and outer metallic bands spaced apart and having relative movement, approximately elliptic springs interposed between the bands, co-acting male and female blocks arranged in pairs within the springs and secured to the bands and clamping the springs in place and provided adjacent to the same with longitudinal grooves receiving the springs and permitting free resilient action of the same, the female blocks being provided with tapered recesses and the male blocks being tapered to fit the recesses and normally extending into but spaced from the walls thereof, and plates interposed between the male blocks and the outer band and adapted to fit against the springs.

5. A wheel of the class described including inner and outer annular members spaced apart and having relative movement, approximately elliptic springs interposed between the members, co-acting blocks arranged within the springs and connected with the members and clamping the springs in place without interfering with their free resilient action and having portions normally interlocked but spaced from and arranged to engage each other to limit the movement of the said members, a tire supported by the outer annular member, and unyielding annular side plates connected with the outer member and loosely embracing the inner annular member and holding the said parts against lateral movement.

6. A wheel of the class described including inner and outer annular members spaced apart and having relative movement, approximately elliptic springs interposed between the members, co-acting blocks arranged within the springs and connected with the members and having portions arranged to engage each other to limit the movement of the said members, a tire supported by the outer annular member, side plates arranged at opposite sides of the inner and outer members, and fastening devices piercing the side plates and the blocks, which are connected with the outer member.

7. A wheel of the class described including inner and outer relatively movable annular members spaced apart, springs interposed between the said members, co-acting inner and outer blocks connected with the inner and outer members and arranged to engage each other to limit the movement of the same, side plates arranged at opposite sides of the inner and outer members and connected with the outer blocks by the fastening devices piercing the outer member, one of the side plates being also provided with transverse spacing tubes fitting against the other side plates, and fastening devices extending through the tubes and connecting the side plates.

In testimony, that we claim the foregoing as our own, we have hereto affixed our signatures in the presence of two witnesses.

PETER G. RAPP.
PETER H. KING.

Witnesses:
FRANK H. LENNARDS,
JOSEPH S. LA BUY.